Feb. 4, 1941.    F. C. BEST    2,230,448
MOTOR VEHICLE
Filed Aug. 18, 1938    2 Sheets-Sheet 1
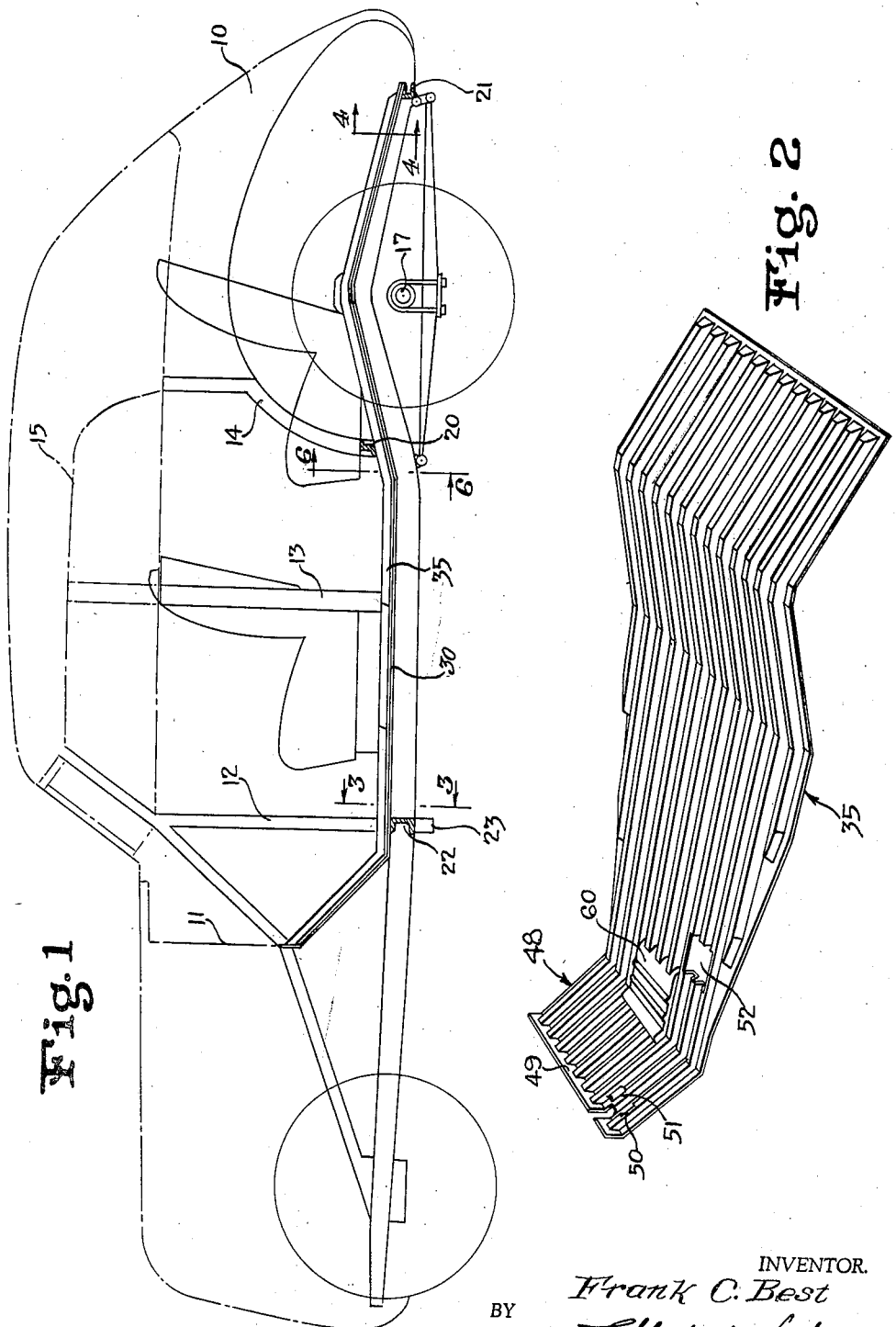
INVENTOR.
Frank C. Best
BY Tibbetts & Hart
ATTORNEYS Feb. 4, 1941.   F. C. BEST   2,230,448
MOTOR VEHICLE
Filed Aug. 18, 1938   2 Sheets-Sheet 2
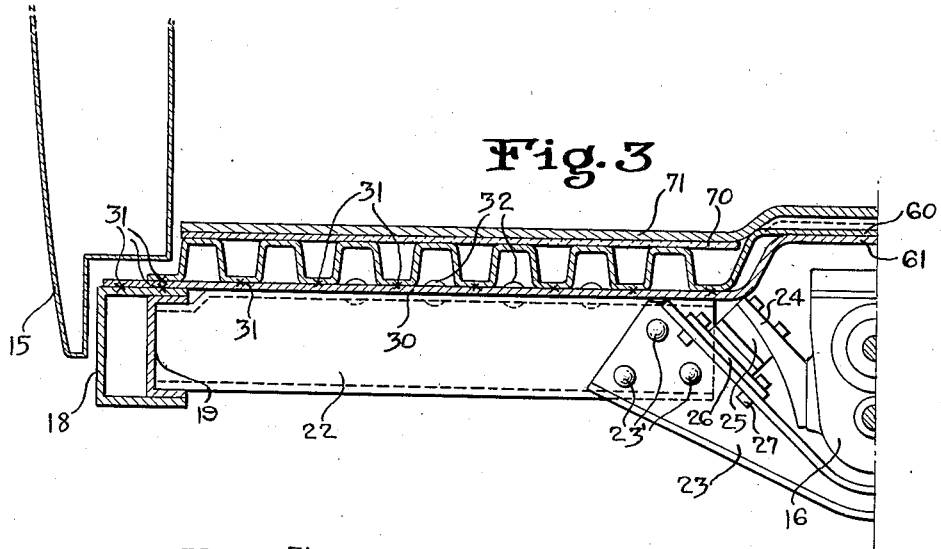
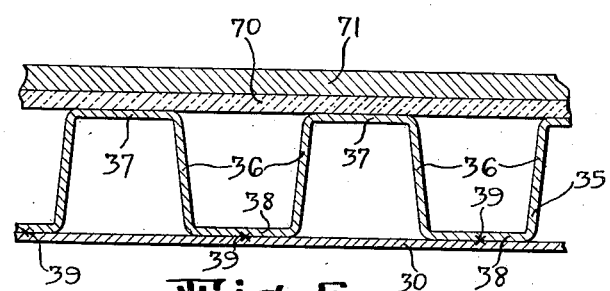
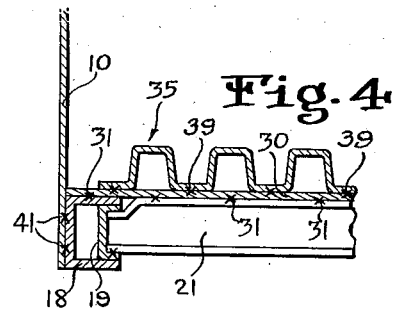
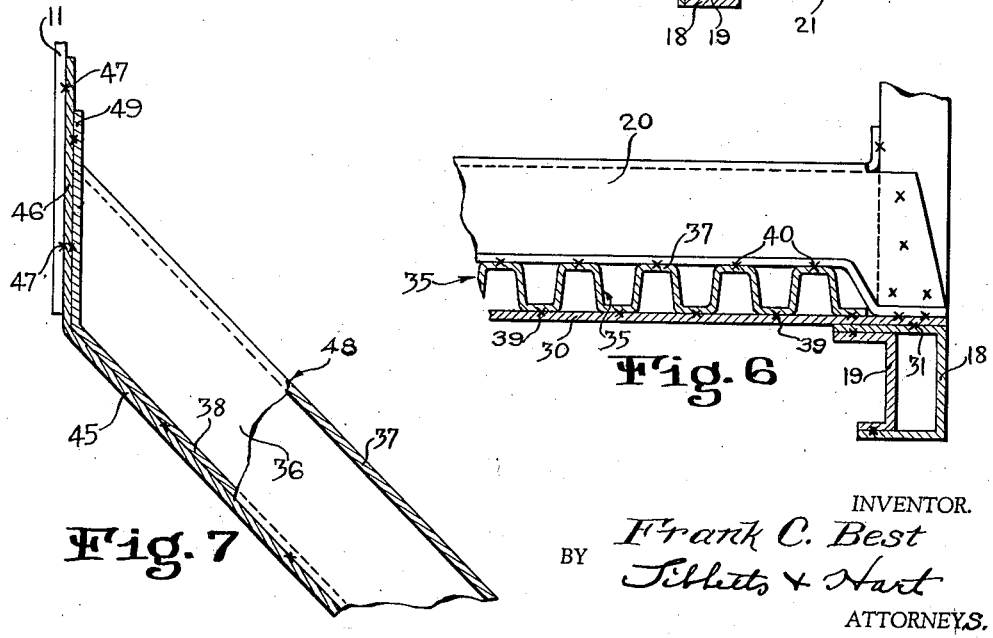
INVENTOR.
Frank C. Best
BY Tibbetts & Hart
ATTORNEYS.

Patented Feb. 4, 1941

2,230,448

UNITED STATES PATENT OFFICE 2,230,448

MOTOR VEHICLE

Frank C. Best, Detroit, Mich., assignor to Packard Motor Car Company, Detroit, Mich., a corporation of Michigan Application August 18, 1938, Serial No. 225,603

9 Claims. (Cl. 296—28)

This invention relates to motor vehicles and more particularly to vehicles in which the frame and body are assembled together as an integral structure.

When the body and the frame of a motor vehicle are formed separately it has been found that bracing means in addition to the cross members connecting the side sills of the frame are necessary to resist torsional stresses, and braces of an X-type have been commonly employed for this purpose. Such frame structures are adequately braced to receive a body of either the sedan or convertible type.

The present trend in motor vehicle design is to fabricate the body of sheet metal and to assemble it with a frame as a unitary structure. In forming vehicles in this manner the floor is utilized as brace means between the frame side sills and when the body is of the sedan type the assembled structure is found to efficiently resist torsion so that the X-brace members previously referred to are not required. Obviously the elimination of torsional bracing means results in a reduction of labor and material costs and also increases the space between the side sills for the disposition of chassis parts.

It is found that a body of the convertible type does not adequately brace the frame side sills to resist torsional stresses, due to the absence of sheet metal across the major portion of the body, and as a consequence the frame must be provided with torsion resisting bracing means. The addition of such bracing means reduces the space under the body floor available for chassis parts and necessitates different frame structures for sedan and convertible bodies of the same vehicle model.

An object of the invention is to overcome the related undesirable features of convertible vehicle structures in which the body and frame are integral by the provision of a floor structure that will resist torsional stresses.

Another object of the invention is to provide for the use of similar frame structures with either sedan or convertible bodies of vehicles in which the frame and body are assembled in permanently secured together relation.

Another object of the invention is to provide a unitary body and frame structure with a flooring capable of effectively resisting high torsional and vertical loads.

A further object of the invention is to provide a flooring for sheet metal vehicle bodies that inherently insulates the interior of the body from heat, cold and vibrational disturbances.

Other objects of the invention will appear from the following description taken in connection with the drawings, which form a part of this specification, and in which:

Fig. 1 is a longitudinal sectional view of a convertible sedan vehicle incorporating the invention;

Fig. 2 is a perspective view of the auxiliary floor structure unit removed from the body;

Fig. 3 is a section of the combined body and frame structure taken on line 3—3 of Fig. 1;

Fig. 4 is another section of the combined structure taken on line 4—4 of Fig. 1;

Fig. 5 is an enlarged fragmentary view of the floor structure shown in Fig. 3;

Fig. 6 is another sectional view of the combined body and frame structure taken on line 6—6 of Fig. 1;

Fig. 7 is a fragmentary sectional view of the forward end of the floor structure attached to the toe board.

Referring to the drawings, 10 indicates generally the conventional metal shell of a convertible type of motor vehicle body having a dash 11 and pillars 12, 13 and 14. Doors, as indicated at 15, are arranged in the usual manner between the pillars at the sides of the body and beneath the body is the usual transmission casing 16 and rear axle structure 17.

The chassis frame for supporting the body shell includes side members and cross members. The side members each consist of a pair of nested channel sections 18 and 19 having their open portions facing inside of the frame. The rear ends of the side members are curved above the forward ends to provide clearance for vertical movement of the rear axle and extending over such curved portions is a cross frame member 20 having its ends welded to the upper flanges of sections 18 and to the pillars 14. Another cross frame member 21 is arranged adjacent the extreme rear end of the frame and its ends extend into the sections 19 of the side frame members and are suitably secured thereto as by welding. Another sectional cross means is provided in the chassis frame in the vicinity of the transmission casing and is composed of similar end sections 22 and an intermediate section 23. The end sections 22 project into the open side of the adjacent side member section and are suitably secured therein, as by welding, and the intermediate section 23 curves beneath the transmission casing and is secured at its ends to the end sections 22 by bolts 23'.

The space between the sections 22 is sufficient to receive the transmission casing and the intermediate section can be utilized as a support for the casing. Arms 24 extend one from each side of the casing and rest upon and are secured to mounts 25 carried by brackets 26 that are fixed on the end portions of the intermediate section by bolts 27.

While this open type of frame structure is not strong enough to adequately resist all torsional and vertical forces, it is desirable as it presents minimum interference to the assembly of chassis parts in the plane thereof. It has heretofore been proposed to secure a floor member 30 with this form of open frame so that it is integral therewith and to also secure the body shell integrally with the frame and floor structure. In the present disclosure the floor member is preferably a unitary sheet of metal resting on the upper flanges of the underlying frame members and secured thereto by welding 31 and rivets 32, the floor member conforming generally in outline to the adjacent portions of the body shell and the frame. This integral arrangement of the floor member and the body shell with the frame provides a rigid structure that has sufficient strength to adequately resist torsional and vertical forces when the body is of the coupe or sedan type. However, with convertible bodies there is a loss of strength due to the absence of a roof and additional stiffening means must be provided. It is the main purpose of this invention to compensate for this loss of strength in convertible structures by the provision of stiffening means that will not interfere with the chassis parts or with the interior body space.

To this end an auxiliary super-floor is applied to the floor member on the open frame structure when a convertible body is to be assembled therewith. This super or upper floor is preferably a unitary structure formed of a corrugated sheet of metal 35. The corrugations extend longitudinally of the vehicle and are similar, being formed by straight side walls 36, flat upper walls 37 and flat lower walls 38. In general the super-floor members correspond in general outline and contour to the lower or main floor member 30. The walls 38 rest upon the lower floor member 30 and are suitably fixed integrally thereto by welding as indicated at 39. The lower flange of the cross frame member 20 rests upon the upper walls 37 of the corrugations and is welded thereto as indicated at 40. The two floor members are an integral structure forming box-shaped girders across the entire width that extend lengthwise substantially the full length of the body. As they are secured to side and cross members of the frame at all points of force application they form an integral structural portion of the welded together body and frame. The girder formation of this floor structure adds sufficient strength to the composite structure to adequately resist the torsional and vertical forces when a convertible type body is assembled, and hence the same basic open frame can be employed with either closed or convertible bodies.

The forward end of the under floor member is bent up to form a toe board 45 and terminates in an upstanding end 46 that parallels a portion of the body dash and is welded thereto as indicated at 47. The forward end of the upper corrugated floor member is likewise formed to provide a toe board 48 and a vertical end 49 is welded to the upstanding end of the under floor member. Suitable openings 50 and 51 are formed in the floor members to receive the conventional clutch and brake pedals and another opening 52 is formed in the floor members to allow for the passage therethrough of a battery (not shown).

The portions 60 and 61 of the upper and lower floor members above the transmission casing are bowed upwardly and the corrugations in the portion 60 are extended transversely of the vehicle. Such arrangement of the corrugations serves to act as reinforcing means between the top of cross member sections 22 and thus assists in supporting the transmission casing.

The upper walls 37 of the corrugated floor member are covered by a layer of insulation material 70 and a carpet 71 rests on the layer of insulation. The corrugated floor member forms air spaces beneath the layer of insulation that protect the interior of the body from heat and cold. The corrugated form of floor member will also serve to eliminate floor vibration that would create a "drumming" noise.

The addition of the upper corrugated floor member to the structure adds sufficient rigidity to compensate for the absence of the roof in convertible bodies to adequately carry vertical loads and to resist torsion, so that a standard open type of frame can be used with sedans, coupes or convertible bodies. This manner of reinforcing a vehicle structure for use with convertible bodies does not interfere with the arrangement of chassis parts beneath the floor, and while it raises the floor a slight amount a low slung design without tunnels extending into the body space or high door sills can be obtained.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, a chassis frame comprising side members and cross members each having integral upper and lower horizontal flanges, and a floor structure comprising a lower member secured on the upper flanges of said side members and one of said cross members and on the lower flange of another cross member, and a corrugated upper member fixed on the lower member and to said lower flange of the cross frame member to which said under floor member is secured.

2. In a motor vehicle, a chassis having a frame comprising side members and a cross member, said side members being of channel section opening inwardly and being curved upwardly adjacent their rearward ends to provide clearance for the rear axle of said chassis, a sub-floor member welded on the upper flanges of said side and cross members, a corrugated super-floor member welded on said sub-floor member between said side members, and a cross frame member welded on said corrugated floor member, said last mentioned cross frame member extending across the upwardly curved portion of said side members and fixed thereto at its ends.

3. In a motor vehicle, the combination of a metal body dash, a frame comprising side and cross members, and a unitary floor fixed to said frame comprising a lower member and an upper corrugated member, said floor members being substantially coextensive and having an upstanding front end portion, said upstanding end of the lower floor member paralleling a portion of the dash and fixed thereto.

4. In a motor vehicle, a chassis frame comprising side members, a unitary floor structure including a lower member fixed to the side members and an upper corrugated member, and a cross member formed of three sections, the two end sections being fixed to the side members and the floor structure and the intermediate section curving downwardly to clear the chassis transmission casing, said floor structure curving upwardly over the transmission casing to provide clearance for the same.

5. In a motor vehicle, the combination of a frame composed of side and cross members, the rear end of the frame having an upwardly curved portion, a metal body carried on the frame having a dash at the forward end, and a unitary body floor consisting of a lower sheet member and an upper corrugated member fixed together and substantially coextensive, the forward portion of said floor extending upwardly from the frame as a toe board and fixed to the dash, the remainder of the floor behind the upwardly extending portion substantially conforming to the shape of and fixed on the frame.

6. In a motor vehicle, a chassis frame consisting of a pair of spaced longitudinally extending side members and at least three cross members, and a floor structure comprising a lower sheet metal member secured to the top of the end cross members, and a corrugated upper member fixed to the bottom of the intermediate cross member and the lower floor member, the end portions of the intermediate cross member being fixed to the top of said lower sheet metal floor member.

7. In a motor vehicle, a chassis frame comprising longitudinally extending side members, a unitary floor structure including substantially coextensive fixed together members, the lower floor structure member being a sheet of metal and the upper floor structure member being a sheet of metal formed with longitudinally and transversely extending corrugations, and a cross frame member fixed to the frame side members and to the floor structure, said cross frame member and said floor structure having aligned portions curved in opposite directions to form an opening, the transverse corrugations of said upper floor member being located in the curved portion forming the opening.

8. In a motor vehicle, the combination of longitudinally extending chassis frame members, oppositely disposed pillars above the frame members, a floor structure comprising a lower member welded to the frame members and a corrugated member welded to the lower member, and a cross member extending across and welded on the top of the corrugated member, the ends of said cross member extending adjacent said pillars and each having a flange secured to the adjacent lower floor member and flanges to which the base portion of the adjacent pillar is fixed.

9. In a motor vehicle, the combination of a chassis frame having longitudinally extending side members and cross members fixed together, a floor structure fixed on said frame and comprising a lower member and an upper corrugated member, said floor members being substantially coextensive and having a rear portion thereof inclined, and a cross member welded on top of the inclined portion of the corrugated member.

FRANK C. BEST.